3,803,292
IRON ENRICHMENT OF FLOUR
Alexis D. Bell, St. Louis, Mo., assignor to Mallinckrodt Chemical Works, St. Louis, Mo.
No Drawing. Continuation-in-part of abandoned application Ser. No. 110,655, Jan. 28, 1971. This application Nov. 17, 1971, Ser. No. 199,734
Int. Cl. C03c 25/02; C01g 49/14
U.S. Cl. 423—274         5 Claims

ABSTRACT OF THE DISCLOSURE

The amount of bioavailable iron in fortified flour can be substantially increased without sacrificing storage life by adding a finely divided iron composition, the particles of which consist essentially of ferrous sulfate monohydrate with a surface coating of ferrous sulfate heptahydrate. The storage life of the flour so fortified is not decreased.

BACKGROUND OF THE INVENTION

This invention relates to the fortification of foods, particularly flour, with iron.

This application is a continuation-in-part of my copending application Ser. No. 110,655, filed Jan. 28, 1971, and now abandoned.

Ferrous sulfate has been used to a limited extent for iron fortification of many food products including bread and other bakery goods; but to fortify flour itself, the practice has been to use reduced iron, sodium iron pyrophosphate, or ferric orthophosphate, all of which are insoluble. The bioavailability of the iron in these insoluble agents is questionable and, furthermore, even higher levels of enrichment are now considered desirable.

The bioavailability of reduced iron, the fortifying agent now most commonly used for flour, is not only questionable but this agent causes other problems as well. For instance, because of its density, it tends to separate from mixtures with the much lighter flour and it also activates the tramp metal detectors employed to inspect packaged flour.

While the bioavailability of iron in soluble ferrous sulfate is known to be much greater, the simple hydrates of this salt have been found unsuitable for use in flour at the desired concentrations.

The heptahydrate of ferrous sulfate is customarily produced in the form of coarse crystals or granules, and attempts to reduce them to a fineness suitable for mixing with flour leads to severe caking problems. The monohydrate is physically much better suited to the purpose but it accelerates deterioration of the flour as evidenced by discoloration and a rancid odor.

For these and other reasons there is a need for better iron-fortifying agents, especially for use in flour.

GENERAL SUMMARY OF THE INVENTION

Among the objects of the present invention may be mentioned the provision of improved compositions for fortifying flour and other food products with iron; the provision of iron-enriched flour which provides increased bioavailability of the iron without substantially diminishing the storage life of the flour; and the provision of methods for preparing products of the character described. Other objects and features will be in part apparent and in part pointed out hereinafter.

The invention accordingly comprises the products and methods hereinafter described, the scope of the invention being indicated in the following claims.

According to the present invention improved compositions for enriching various food products, including flour, with iron comprise finely divided ferrous sulfate, the particles of which consist essentially of ferrous sulfate monohydrate with a surface coating of ferrous sulfate heptahydrate. The proportion of the heptahydrate salt should be sufficiently great so as to completely coat the monohydrate salt but is not otherwise critical. A composition comprising approximately 1–20% of the heptahydrate salt has been found satisfactory, though lesser or greater proportions are still useful and fall within the broad scope of the invention.

Several methods have been devised for producing compositions of the present invention, and these are more fully described hereinafter.

The ferrous sulfate compositions of the present invention have a density closely approximating that of flour, and stable, intimate admixtures of flour with such compositions are readily prepared. The resulting enriched flour is characterized by the increased bioavailability of the contained iron compared with iron-enriched flours previously known. Moreover the enriched flour of the present invention has a storage life comparable to that of the pure flour itself. Therefore, the further addition of stabilizers or other foreign additives which are of no nutritional value and which may be objectionable on other grounds is unnecessary.

DESCRIPTION OF THE PREFERRED EMBODIMENTS

At the present time fortified flour contains about 0.003% iron (Fe), of which about 0.001% is naturally present in flour. It has lately been proposed to increase the level to about 0.01%. A nutritionally acceptable level of added iron in fortified flour would therefore fall within the range of approximately 0.002% up to 0.025% Fe, the preferred level based upon present recommendations being approximately 0.01% Fe. The storage life of the flour fortified in accordance with the present invention is at least as great as that of pure flour itself, and the bioavailability of the iron in the agent of the present invention is at least as great as that of ordinary ferrous sulfate. In effect the ferrous sulfate of the present invention has the desirable qualities associated with forms of ferrous sulfate now available but without its adverse side effects.

The improved iron-enriching agents of the present invention may, for example, be prepared using conventional spray-drying apparatus and methods. The particle size of the ferrous sulfate composition also appears to have some effect on the stability of the enriched flour and it may be varied in the usual manner. Optimum stability has been observed when the ferrous sulfate has a particle size within the range of 4 to about 25 microns as measured using a "Fischer Sub-Sieve Sizer." Generally speaking, the larger the particle size the greater will be the stability of the fortified flour. It is also desirable to adjust the size of the spheres so that their bulk density approximates that of flour as nearly as possible, i.e., approximately 5.3 lbs. per gallon for loose flour.

In the spray-drying process each droplet formed at the edge of the atomizer wheel goes through the following heating and cooling cycle. As the temperature of the droplet increases, water is removed and the concentration increases to the point at which ferrous sulfate monohydrate starts to crystallize. Crystallization of the monohydrate continues until the temperature of the particle drops below the melting point of ferrous sulfate heptahydrate (64° C.). At this point, any remaining water in the droplet crystallizes as the ferrous sulfate heptahydrate on the surface of the dry particle. This heating and cooling cycle, described above, for the case where the feed stock is a pure solution, is also true for the case where a ferrous sulfate monohydrate slurry is used as a feed stock to the dryer.

Alternatively, a hot slurry of ferrous sulfate monohydrate, which may be prepared by conventional procedures, is first centrifuged. The wet cake so obtained is then immediately broken up to less than 100 mesh and cooled to room temperature. The resulting free-flowing product consists of ferrous sulfate monohydrate coated with ferrous sulfate heptahydrate and has a light color similar to that of the spray-dried product.

The following examples illustrate the invention:

EXAMPLE 1

Spray-dried ferrous sulfate suitable for use in the present invention is readily prepared using conventional spray-drying equipment and techniques. For example using a Nichols-Niro Utility Spray Drier No. 6903 equipped with a high vane wheel atomizer, the input temperature was 400° C. and the output temperature was 150° C. The feed material was a solution of ferrous sulfate having a density of 38–42° Bé. The feed material was added to the drier at such a rate as to produce 44 lbs. of dried product per hour. With the atomizer adjusted to a speed setting of 3.0 to 3.5 the particle size distribution of the product was:

| U.S. standard sieve screen | Percent by weight | Fischer sub-sieve sizer, microns |
|---|---|---|
| Retained on: | | |
| 100 mesh | 2.8 | (¹) |
| 140 mesh | 9.6 | >11 |
| 200 mesh | 30.9 | 10.2 |
| 230 mesh | 19.6 | 7.5 |
| 270 mesh | 7.4 | 8.0 |
| 325 mesh | 8.5 | 8.25 |
| Passing 325 mesh | 21.5 | 6.7 |
| Total | 100.3 | |

¹ Not measured.

The product contained 31.96% iron ($Fe^{+2}$) and 11.86% water, both by weight. The bulk density was approximately 4.3 lbs. per gallon loose and 5.2 lbs. per gallon tapped.

EXAMPLE 2

Procedure for testing the stability of iron-enriched flour

The following procedure was used to test the stability of flour enriched with various iron-fortifying agents. For these tests fresh flour was obtained from a mill immediately after milling and was stored at 0° C. in double-thickness polyethylene bags. An amount of the iron fortifying agent to be tested equivalent to 11 mg. Fe was added to a 100 g. of flour and the sample was blended for 1 hour on a roller-mill. Each sample was then divided into two equal portions and stored in screw-cap amber bottles, one at 0° C. and the other at 50° C. The samples were examined for color and aroma after 1, 3, 5, 8, 11, 15, 19, 24 and 29 days of storage. For control purposes a sample of unenriched flour was included in both series of tests. Each test sample stored at 50° C. was compared with a control sample of the same flour which had been stored at 0° C. as well as with a control sample of unenriched flour which had similarly been stored at 50° C. A test sample was considered to have failed as soon as any off-color or off-aroma was detected by a trained observer.

EXAMPLE 3

Results of stability test

The stability of flour fortified with the spray-dried ferrous sulfate of the present invention was compared with flour fortified with ordinary commercial Ferrous Sulfate Dried U.S.P., which is in the form of a crystalline powder, and with reduced iron powder. The spray-dried ferrous sulfate was tested both as it comes from the chamber of the spray-drier and after being sieved to remove particles smaller than 230 mesh. Likewise the commercial ferrous sulfate was tested as is and after it had been sieved to remove particles larger than 100 mesh and smaller than 200 mesh. The reduced iron powder was of a grade (Iron Reduced U.S.P.) commonly used for enriching flour.

The results were as follows:

| Fortifying agent | Odor | Color |
|---|---|---|
| | Failure of flour sample at— | |
| Ferrous sulfate dried USP (crystalline powder "as is"). | 4 days | 11 days. |
| Ferrous sulfate dried USP sieved (−100+200 mesh). | do | Do. |
| Ferrous sulfate spray-dried microspheres (from chamber as is). | 25 days | Approx. 30 days. |
| Ferrous sulfate spray-dried microspheres sieved (+230 mesh). | Approx. 30 days. | Do. |
| Reduced iron | do | Do. |
| None | do | Do. |

In other tests the bioavailability of iron from spray-dried ferrous sulfate was found to be as great or greater than from ordinary commercial grades of ferrous sulfate crystalline powder.

EXAMPLE 4

Procedure for preparing spray-dried ferrous sulfate from a slurry of ferrous sulfate monohydrate A solution of ferrous sulfate was first boiled down to >42° Bé, at which point ferrous sulfate monohydrate began to crystallize, and boiling was continued until the solution reached a Beaumé of 45 to 52° Bé. The slurry was then cooled to 165 to 190° F. and fed into a conventional spray-dried equipped with an atomizer of the low vane type rotated at 19,000 r.p.m. The inlet temperature was maintained at about 375° C. and the outlet temperature at about 130° C. The product was collected from both the chamber and cyclone.

Analysis of the product showed:

| | Percent |
|---|---|
| Total iron (as $Fe^{+2}$) | 32.25 |
| Iron as $FeSO_4 \cdot 7H_2O$ | 0.85 |
| Iron as $FeSO_4 \cdot H_2O$ (by difference) | 31.40 |

Equivalent to:

| | Percent |
|---|---|
| $FeSO_4 \cdot H_2O$ | 95.53 |
| $FeSO_4 \cdot 7H_2O$ | 4.23 |
| | 99.76 |

The particle size as measured with a Fischer Sub-Sieve Sizer was 11.7 microns and the tapped bulk density was 7.6 lbs./gal.

EXAMPLE 5

Alternative procedure for preparing ferrous sulfate monohydrate coated with ferrous sulfate heptahydrate A slurry was first prepared as in Example 4. The slurry was then cooled to 180° F. and the solids were removed by centrifugation. The wet centrifuge cake was then cooled to about 40° C. and immediately screened through a 100 mesh screen. The product was practically white, free flowing, and dry to the touch.

Analysis of the product showed:

| | Percent |
|---|---|
| Total iron (as $Fe^{+2}$) | 31.16 |
| Iron as $FeSO_4 \cdot 7H_2O$ | 3.14 |
| Iron as $FeSO_4 \cdot H_2O$ (by difference) | 28.02 |

Equivalent to:

| | Percent |
|---|---|
| $FeSO_4 \cdot H_2O$ | 85.2 |
| $FeSO_4 \cdot 7H_2O$ | 15.6 |
| | 100.8 |

The particle size as measured using a Fischer Sub-Sieve Sizer was 15.0 microns and the tapped bulk density was 7.8 lbs./gal.

EXAMPLE 6

Assay method for mixtures of ferrous sulfate heptahydrate and ferrous sulfate monohydrate The method utilizes the methanol solubility differences between these hydrates; the heptahydrate is completely soluble whereas the monohydrate is insoluble.

1. Weigh and then add 2.5 g. of sample to a glass-stoppered Erlenmeyer flask containing 50 ml. of absolute methanol. Prepare a control and carry through the following steps.
2. Shake for 5 minutes and allow to stand for one hour.
3. Filter through a fine sintered glass crucible into a 500 ml. vacuum flask. Wash with two 10 ml. portions of absolute methanol.
4. Add 70 ml. of distilled water and 50 ml. of 10% w./w. sulfuric acid to the filtrate and titrate with tenth normal potassium permanganate solution until a permanent pink color is produced. Each ml. of N/10 KMnO$_4$ corresponds to 27.8 mg. of ferrous sulfate heptahydrate.

EXAMPLE 7

Comparison of flour enriched with spray-dried and ordinary ferrous sulfate monohydrate Two sixty pound batches of flour, one containing spray-dried ferrous sulfate prepared as described in Example 4 and the other containing a regular commercial grade of ferrous sulfate monohydrate, were prepared as follows. Each contained 0.011% Fe.

To one pound of flour in a plastic bag was added 7.88 g. of the ferrous sulfate and the mixture was shaken for several minutes. This mixture was added to 59.0 lbs. of flour in a 2 cu. ft. twin-shell blender and blended for 20 minutes.

Analyses of these blends showed:

|  | Iron (Fe) percent | |
|---|---|---|
|  | Theory | Found |
| Ordinary commercial grade | 0.011 | 0.0096 |
| Spray-dried | 0.011 | 0.0107 |

In the flour stability test, the blend containing ordinary commercial ferrous sulfate failed in 3 to 6 days, while that containing spray-dried ferrous sulfate remained stable for approximately 30 days.

The finely divided particles of ferrous sulfate monohydrate coated with ferrous sulfate heptahydrate of the present invention may be added to flour to achieve a desired enrichment. As stated above, flour naturally contains about 0.001% iron (Fe). The ferrous sulfate of the present invention may be added within a range of approximately 0.002% to 0.025% Fe, thereby proportionally enriching the iron content. The iron in the enriched flour has the bioavailability of ferrous sulfate yet the storage life of the flour is not substantially decreased. The preferred level based upon present recommendations is approximately 0.01% Fe but a smaller or larger fortification may be carried out if desired. Thus the fortification may be decreased or may be increased up to approximately 0.025% Fe, as may be desired. In all such instances the bioavailability of the iron is that which is expected with ferrous sulfate but the enriched flour does not exhibit an increased tendency to deteriorate as compared to the flour per se.

In view of the above, it will be seen that the several objects of the invention are achieved and other advantageous results attained.

As various changes could be made in the above methods and products without departing from the scope of the invention, it is intended that all matter contained in the above description shall be interpreted as illustrative and not in a limiting sense.

What is claimed is:

1. A finely divided composition useful for enriching foods with iron which consists essentially of ferrous sulfate monohydrate, the particles of which are provided with a surface coating of ferrous sulfate heptahydrate.
2. The composition according to claim 1 wherein the particles are in the form of spray-dried microspheres.
3. The composition according to claim 1 wherein ferrous sulfate heptahydrate comprises 1–20% of the total weight of the ferrous sulfate.
4. The composition according to claim 2 wherein the microspheres are substantially completely retained by a 230 mesh U.S. standard sieve screen.
5. The composition according to claim 2 wherein the microspheres have a diameter in the range of approximately 4 to 25 microns.

References Cited

UNITED STATES PATENTS 2,928,725   3/1960   Hughes _____ 423—558

OSCAR R. VERTIZ, Primary Examiner

H. S. MILLER, Assistant Examiner

U.S. Cl. X.R.

423—558; 117—100; 99—93